United States Patent
Neill et al.

(10) Patent No.: US 9,059,996 B2
(45) Date of Patent: *Jun. 16, 2015

(54) METHODS AND SYSTEMS FOR DISTRIBUTED PROCESSING ON CONSUMER DEVICES

(71) Applicant: CSC Holdings, LLC, Bethpage, NY (US)

(72) Inventors: Richard W. Neill, Syosset, NY (US); Leon Rivkin, East Meadow, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/164,642

(22) Filed: Jan. 27, 2014

(65) Prior Publication Data

US 2014/0164469 A1    Jun. 12, 2014

Related U.S. Application Data

(63) Continuation of application No. 13/549,865, filed on Jul. 16, 2012, now Pat. No. 8,638,937, which is a continuation of application No. 13/016,065, filed on Jan. 28, 2011, now Pat. No. 8,243,932, which is a (Continued)

(51) Int. Cl.
*G06F 21/00*    (2013.01)
*H04L 29/08*    (2006.01)

(Continued)

(52) U.S. Cl.
CPC ............... *H04L 67/10* (2013.01); *H04W 12/08* (2013.01); *G06F 9/5072* (2013.01); *G06F 2209/5017* (2013.01)

(58) Field of Classification Search
CPC ...... H04W 12/08; H04L 45/245; H04L 69/22
USPC ....... 726/3; 713/189; 380/270; 709/201, 219, 709/224–226, 229
See application file for complete search history.

(56) References Cited

U.S. PATENT DOCUMENTS

| | | |
|---|---|---|
| 5,606,493 A | 2/1997 | Duscher et al. |
| 5,815,793 A | 9/1998 | Ferguson |
| 6,170,011 B1 | 1/2001 | Macleod Beck et al. |

(Continued)

OTHER PUBLICATIONS

Ping Jiang; et al.; "Concept mining for distributed alliance in multi-agent based virtual enterprises" ;Cybernetics and Intelligent Systems, 2004 IEEE Conference on vol. 2; DOI: 10.1109/ICCIS.2004.1460698;Publication Year: 2004 , pp. 844-849.*

(Continued)

*Primary Examiner* — Harunur Rashid
*Assistant Examiner* — Angela Holmes
(74) *Attorney, Agent, or Firm* — Goodwin Procter LLP (57) ABSTRACT

Systems and methods are used to provide distributed processing on a service provider network that includes a plurality of remotely located consumer devices. Each of the remotely located consumer devices includes a processing device. A service is provided from the service provider network to the remotely located consumer devices. Distributed processing of a task on the processing devices of the remotely located consumer devices occurs, the distributed processing being unrelated to the service provided to the consumers. The distributed processing occurs even when the processing devices are in use by corresponding remotely located consumer devices.

15 Claims, 6 Drawing Sheets

Related U.S. Application Data continuation of application No. 11/362,846, filed on Feb. 28, 2006, now Pat. No. 7,904,908.

(60) Provisional application No. 60/656,897, filed on Mar. 1, 2005.

(51) Int. Cl.
*G06F 9/50* (2006.01)
*H04W 12/08* (2009.01)

(56) References Cited

U.S. PATENT DOCUMENTS

| | | |
|---|---|---|
| 6,370,508 B2 | 4/2002 | Beck et al. |
| 6,374,357 B1 | 4/2002 | Mohammed et al. |
| 6,381,640 B1 | 4/2002 | Beck et al. |
| 6,684,250 B2 | 1/2004 | Anderson et al. |
| 6,711,616 B1 | 3/2004 | Stamm et al. |
| 6,910,072 B2 | 6/2005 | Macleod Beck et al. |
| 7,043,522 B2 | 5/2006 | Olson et al. |
| 7,072,963 B2 | 7/2006 | Anderson et al. |
| 7,120,700 B2 | 10/2006 | Macleod Beck et al. |
| 7,472,172 B2 | 12/2008 | Anderson et al. |
| 7,478,233 B2 | 1/2009 | Olson et al. |
| 7,634,806 B2 | 12/2009 | Zinda et al. |
| 7,676,541 B2 | 3/2010 | Olson et al. |
| 7,809,857 B2 | 10/2010 | Anderson et al. |
| 7,814,200 B2 | 10/2010 | Lusher et al. |
| 7,899,915 B2 | 3/2011 | Reisman |
| 7,961,717 B2 | 6/2011 | Lee et al. |
| 7,987,491 B2 | 7/2011 | Reisman |
| 8,161,172 B2 | 4/2012 | Reisman |
| 8,165,146 B1 | 4/2012 | Melick et al. |
| 8,385,971 B2 | 2/2013 | Rhoads et al. |
| 8,527,640 B2 | 9/2013 | Reisman |
| 8,543,532 B2 | 9/2013 | Sathish et al. |
| 8,631,456 B2 | 1/2014 | Reisman |
| 8,640,183 B2 | 1/2014 | Reisman |
| 2004/0019432 A1 | 1/2004 | Sawafta et al. |
| 2004/0021681 A1 | 2/2004 | Liao |
| 2004/0098447 A1* | 5/2004 | Verbeke et al. ............... 709/201 |
| 2005/0273511 A1 | 12/2005 | Ferreira de Andrade et al. |
| 2006/0153173 A1 | 7/2006 | Beck et al. |
| 2008/0174598 A1 | 7/2008 | Risenhoover |
| 2011/0034176 A1 | 2/2011 | Lord et al. |
| 2011/0112760 A1 | 5/2011 | Serbanescu et al. |
| 2011/0143811 A1 | 6/2011 | Rodriguez |
| 2011/0161076 A1 | 6/2011 | Davis et al. |
| 2011/0206039 A1 | 8/2011 | Lee et al. |
| 2011/0212717 A1 | 9/2011 | Rhoads et al. |
| 2011/0219419 A1 | 9/2011 | Reisman |
| 2012/0258776 A1 | 10/2012 | Lord et al. |
| 2012/0324100 A1 | 12/2012 | Tomici et al. |
| 2013/0054820 A1 | 2/2013 | Reisman |
| 2013/0061264 A1 | 3/2013 | Reisman |
| 2013/0067526 A1 | 3/2013 | Reisman |
| 2013/0073738 A1 | 3/2013 | Reisman |
| 2013/0074129 A1 | 3/2013 | Reisman |
| 2013/0135147 A1 | 5/2013 | Lee et al. |

OTHER PUBLICATIONS

Esteves, R.G., et al., "Real options for mobile communication management", GLOBECOM Workshops (GC Wkshps), 2011 IEEE (978-1-4673-0039-1); 2011, p. 1241-1246.

Khan, et. al., "Performance evaluation of fault tolerance techniques in grid computing system", Computers & Electrical Engineering (0045-7906), Nov. 1, 2010, vol. 36, Iss. 6, p. 1110-1122.

Philip, Rizk, et al., "A GridFTP Overlay Network Service", GRID '06: Proceedings of the 7th IEEE/ACM International Conference on Grid Computing, Sep. 2006.

Ideguchi, T., et al., "The distributed minicomputer network, its implementation and evaluation", International Journal of Mini and Microcomputers, vol. 2, No. 2, pp. 23-29, 1980.

* cited by examiner

METHODS AND SYSTEMS FOR DISTRIBUTED PROCESSING ON CONSUMER DEVICES

CROSS-REFERENCE TO RELATED APPLICATIONS

This application is a continuation application of U.S. patent application Ser. No. 13/549,865, filed Jul. 16, 2012, which is a continuation application of U.S. patent application Ser. No. 13/016,065, filed Jan. 8, 2011, now U.S. Pat. No. 8,243,932, which is a continuation application of U.S. patent application Ser. No. 11/362,846, filed Feb. 28, 2006, now U.S. Pat. No. 7,904,908, which claims priority from U.S. provisional application 60/656,897, filed Mar. 1, 2005, the entire contents of which are incorporated herein in their entirety.

TECHNICAL FIELD

The present invention relates to methods and systems for distributed processing on consumer devices. In particular, the present invention relates methods and systems for distributed processing even when the consumer devices are in use by a consumer.

BACKGROUND OF THE INVENTION

There has been a large growth in the deployment of consumer electronic devices by service providers such as cable, satellite and phone companies. These service providers are installing digital consumer electronic devices to millions of homes annually. In many cases these consumer electronic devices are dedicated for the delivery of digital television programming or other interactive entertainment services.

These consumer electronic devices are being equipped with faster and more powerful processors. These processors often have more speed and power than is used by the consumer electronic devices, even during peak usage. Further, the processors may have periods during a day where they are not used at all, such as during times when the consumer is sleeping or away from home. It would be advantageous if the service provider could find a way to use the extra speed and power of the processor not being utilized by the consumer.

In the cable industry, it is common for a cable service provider to provide a cable box to a consumer so that the consumer may receive cable service. Typically, the cable service provider will retain ownership of the cable box, and may charge the consumer a monthly fee for each box provided. These cable boxes are being equipped with faster and more powerful processors. While the cable boxes of today provide more services than in the past, such as interactive guides, pay per view, movies on demand, etc., even these extra services may often under utilize the processor. Further, because the cable service provider usually retains ownership of the cable box and the processor it is equipped with, it would be advantageous if the cable service provider could find a way to use the extra speed and power of the processor not being utilized by the consumer.

SUMMARY OF THE INVENTION

Systems and methods are used to provide distributed processing on a service provider network that includes a plurality of remotely located consumer devices. Each of the remotely located consumer devices includes a processing device. A service is provided from the service provider network to the remotely located consumer devices. Distributed processing of a task on the processing devices of the remotely located consumer devices occurs, the distributed processing being unrelated to the service provided to the consumers. The distributed processing occurs even when the processing devices are in use by corresponding remotely located consumer devices.

DETAILED DESCRIPTION

The present invention provides systems and methods for distributed processing on a service provider network that includes a plurality of remotely located consumer devices. Distributed processing of a task on the processing devices of the remotely located consumer devices occurs, the distributed processing being unrelated to the service provided to the consumers. The distributed processing occurs even when the processing devices are in use by corresponding remotely located consumer devices.

Currently, there is a need for processing tasks to be performed that require extremely high processing speeds or processing of extremely large data space. For example, such needs exist in the following areas: Bioinformatics, Chemical, and Drug Research in areas such molecular modeling to screen millions of compounds from a chemical database; Financial Services for portfolio optimization, risk analytics, and trade analysis; Energy in areas such as seismic processing and reservoir simulation calculations; Government in areas such as econometric modeling, imagery analysis, geospatial intelligence, weather, astronomy, physics, and other scientific research; and Application Service Providers for database intensive applications such as search engines. The present invention provides for distributed processing on a large scale to provide such extremely high processing speeds.

Figure 1:
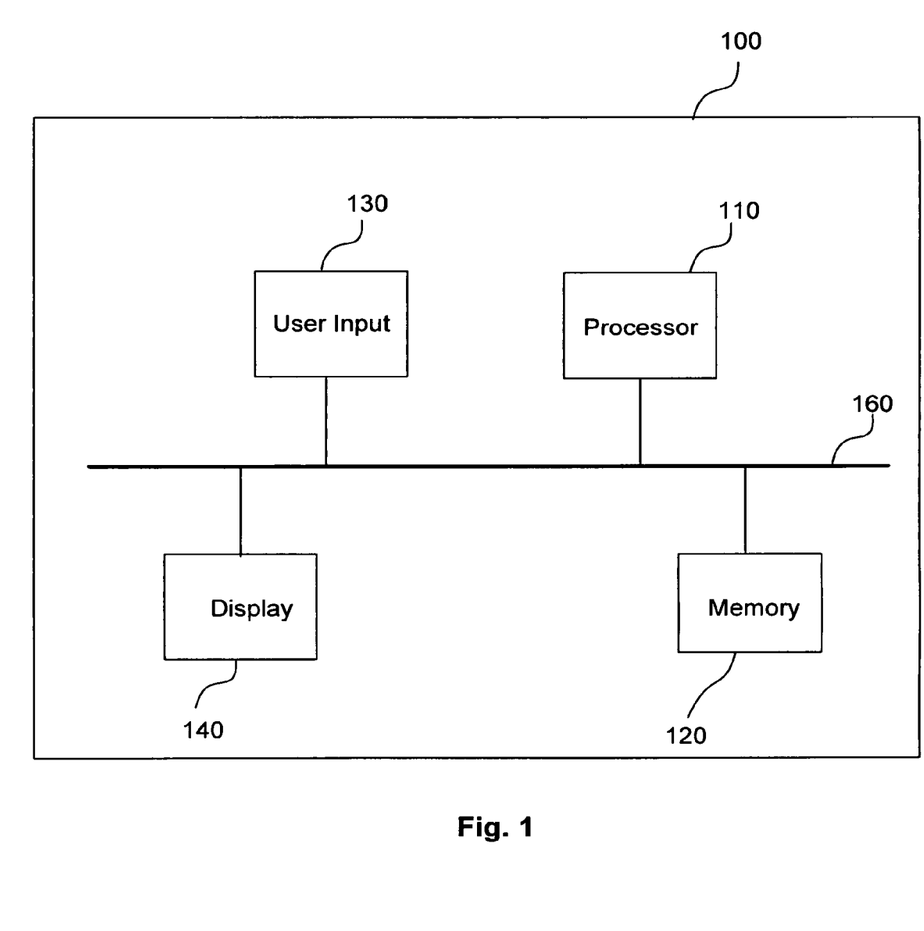
FIG. 1 is a block diagram in accordance with an embodiment of the present invention.

FIG. 1 depicts a block diagram of an embodiment of the present invention. Computing device 100 is suitable for use with the present invention. The computing device 100 may include a processor 110, a memory 120, a user input 130 and a display 140. The memory 120 may contain software to be run in conjunction with processor 110, and may cause images to be displayed on display 140. The software may be specifically designed to cause computing device 100 to implement the present invention. Computing device 100 may be one of various types of computing devices, such as a workstation, a personal computer, a server, a head-end in a cable system, or any other type of computing device.

The processor 110 may be may be any type of processor, such as a general-purpose microprocessor (i.e., a Pentium series microprocessor manufactured by the Intel Corporation of Santa Clara, Calif.). In another embodiment, the processor 110 can be an Application Specific Integrated Circuit (ASIC), which has been designed to implement in its hardware and/or firmware at least a part of a method in accordance with embodiments of the present invention, or a RISC (reduced instruction set computer) processor.

Memory 120 can be any device capable of storing analog or digital information, such as a hard disk, Random Access Memory (RAM), Read Only Memory (ROM), flash memory, a compact disk, a magnetic tape, a floppy disk, and any combination thereof, for example.

User input 130 can be any type of input device, such as a keyboard, keypad, pointing device, microphone, mouse, wired or wireless remote control, touch pad, touch screen, a port(s) to attach other input devices, voice recognition software, etc. Any type of input device will function in accordance with embodiments of the present invention.

The display 140 can be any type of display or screen that is capable of displaying images. For example, the display may be a CRT or LCD monitor, a heads-up display, a television, etc. The display 140 may be structurally included as part of the electronic device, or may be physically separated from but connected with the other components of device 100, such as a monitor in a desktop computer.

Figure 2:
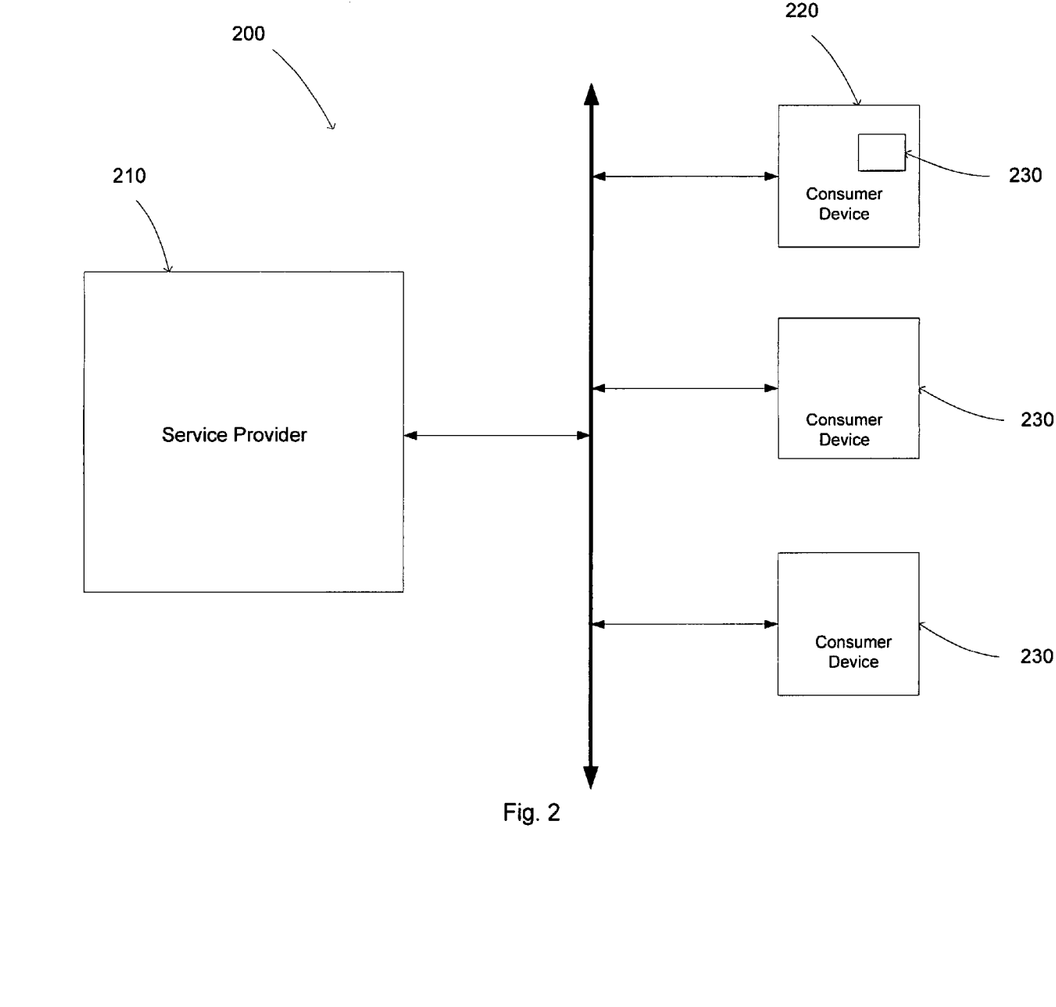
FIG. 2 is a system in accordance with an embodiment of the present invention.

FIG. 2 depicts a block diagram of an embodiment of the present invention. The system 200 includes a service provider network 210, and a plurality of consumer devices 220. The service provider network 210 may include one or more of the following: a processor, a memory, a display, and software programmed to carry out the functionality of the present invention. For example, the service provider network 210 may include elements such as illustrated in FIG. 1.

The service provider network 210 may be any type of service provider network that provides a service to consumers on a consumer device. For example, the service provider network 210 may be a cable or satellite television network, an Internet Service Provides (ISP), a cellular phone service provider, a portable computer service provider, etc. The service provider network may provide a service to the consumer devices by any means, such as over wired or fiber optic cables, wirelessly, by satellite transmission, through a phone network, etc.

The consumer devices 220 include a processor 230, and may include other elements, such as the elements illustrated in FIG. 1, as well as software to carry out required functionality. The consumer devices 220 receive a consumer service from the service provider network 210. The consumer devices 220 may be any type of consumer device that can receive a consumer service, such as a cellular phone, a computer, a portable computing device, a set top box in a cable television or satellite system (or hardware/software built in to a television to receive such cable or satellite television), a camera, a combination of any of the above, etc. The consumer device 220 receives a service from the service provider network 210 as described above.

The consumer device may be purchased by the consumer, or may often be rented by the consumer from the service provider. For example, cable or satellite boxes are usually rented from a service provider by the consumer. The processor 230 of the functions with other elements of the consumer device 220 to provide the desired service to a consumer. The processor 230 may be a powerful processor that may be greatly underutilized even when the consumer device 220 is utilizing the processor 230 to it's fullest extent. Further, when the consumer is not utilizing the consumer device at all, the power of the processor is not used. The present invention utilizes the processor 230 on consumer devices 220 in a service provider network 200 to perform distributed processing, even when the processor 230 is being utilized by the consumer device 220, as further explained below.

Figure 3:
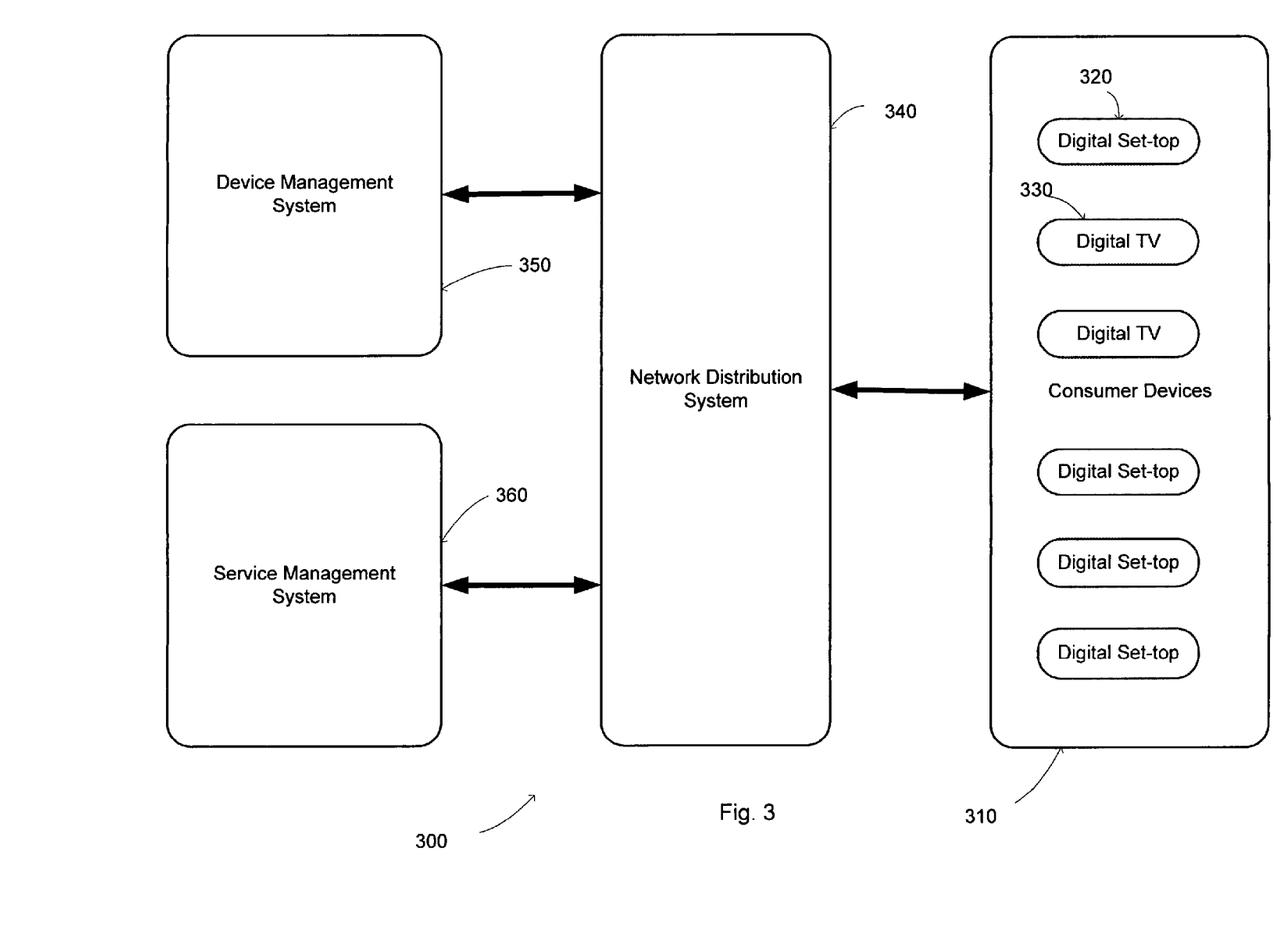
FIG. 3 illustrates a system in conjunction with embodiments of the present invention.

FIG. 3 illustrates a system 300 in conjunction with embodiments of the present invention. The system 300 includes consumer devices 310, network distribution system 340, device management system 350 and service management system 360. The consumer devices 310 may be any type of consumer device that includes a processor and is configured to receive a service from a service provider, as described above. As one example of consumer devices 310, there is illustrated digital set-top boxes 320 and digital TVs, such as may be used with a cable or satellite television system, for example. The consumer devices 310 may be connected to the network distribution system 340 by any means, such as by satellite, wireless, cables such as fiber optic cables, etc.

The network distribution system 340 may provide two-way connectivity of these consumer devices 310 to a service provider. The service provider systems may include a device management system 350 and a service management system 360 as shown in FIG. 3. These elements may be used to control delivery of service and distributed processing on the consumer devices. The distributed processing is processing in addition to and unrelated to services provided to the consumer devices 310, as further discussed below.

As an example, in a system such as a cable television system, the consumer devices 310 may receive cable television service, where the consumer device may be a set-top box 320, for example. A large number of customers are connected to the cable television system, all receiving cable television service from the service provider. Such cable television systems typically utilize set-top boxes in conjunction with delivery of the cable television service. The set-top boxes are typically rented from the service provider, and will be equipped with various software and hardware to allow delivery of the service to the consumer via the consumer device. The set-top boxes will include one or more processor, such as processor 230 illustrated in FIG. 2. These processors are typically much more powerful than needed to accomplish the needed functionality of delivering the service to the consumer, even when the consumer is actively using the set-top box to view programs, to view program guides, to view the internet, etc. Further, when the set-top box is not in use, even more power from the processor goes unused.

Accordingly, the present invention will utilize the unused power of the processors of one or more of the consumer devices to perform distributed processing. This distributed processing may occur even when the processor is actively engaged in processing, such as when delivery various consumer services. This is possible due to the excess power of the individual processors. The system of the present invention can take a processing task that would normally take enormous processing power, break that task in smaller portions, and distribute the processing to the various consumer devices 310. The device management system may include the functionality to receive a large processing task, to subdivide that large processing task into smaller tasks, and to direct the smaller processing tasks to processors on individual processing devices. Over the network distribution system 340. The results of the individual processing tasks may then be directed back to the device management system 350 over the network distribution system 340, and aggregated to complete the larger processing task.

Alternatively, the first subtask can be sent to a first group of the consumer devices, and the second subtask can be sent to a second group of the consumer devices. In this way, the subtasks can be processed on more than one processor at the same time, which can provide increased quality of service and fault tolerance.

The service provider or another entity may operate the elements described to provide the distributed processing. The distributed processing may be offered to entities outside the service provider organization who need but do not have the large processing power.

Figure 4:
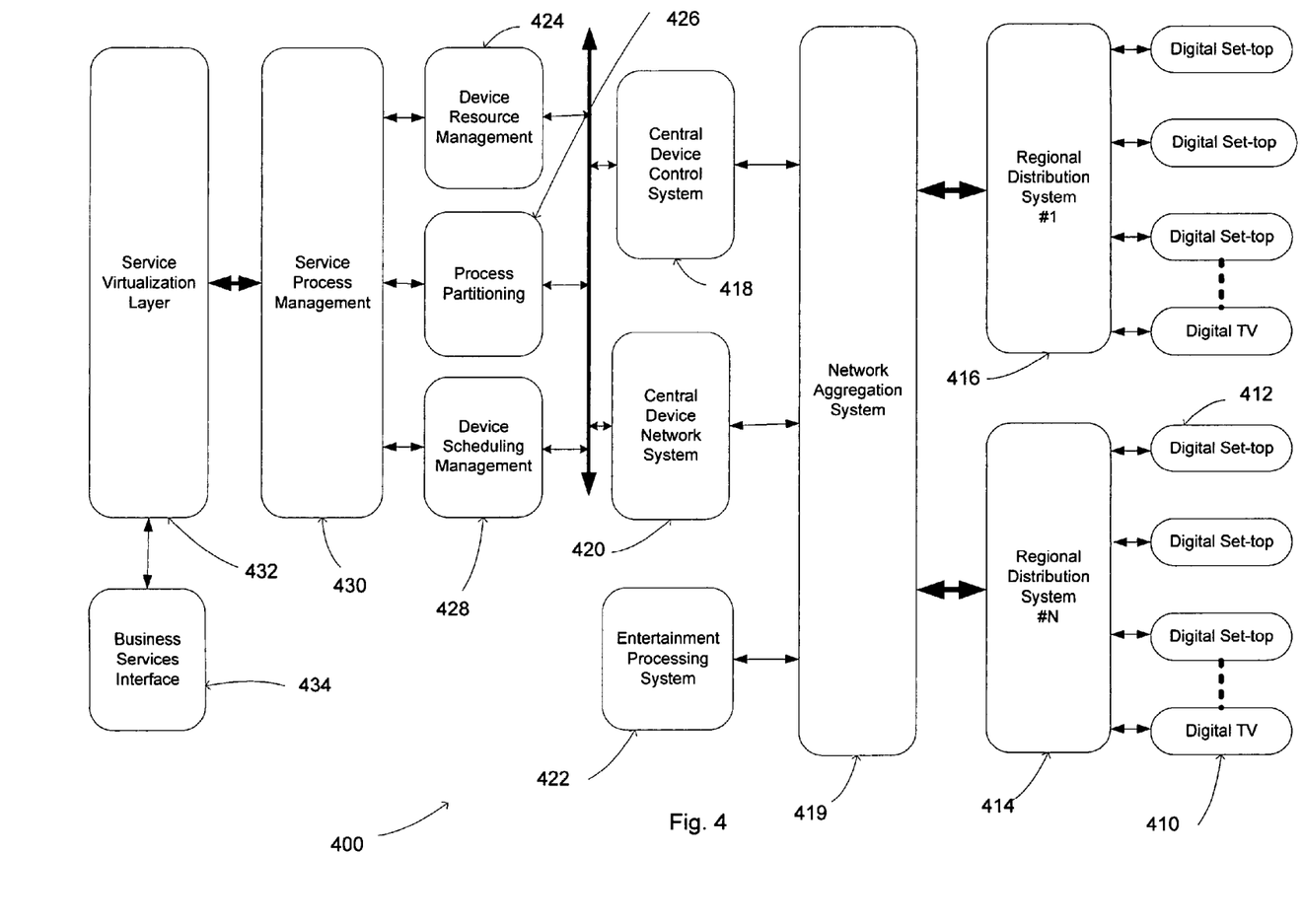
FIG. 4 illustrates a system in accordance with embodiments of the present invention.

FIG. 4 illustrates a system 400 that may be used in conjunction with embodiments of the present invention. Each of the elements of FIG. 4 will contain the needed hardware and software to perform the described functionality. Consumer devices 410, 412, etc. are connected to a regional distribution system 414. Other consumer devices may be connected to other regional distribution systems, such as regional distribution system 416. Any number of regional distribution systems may be used. The regional distribution systems may be part of one service provider, or may be from separate service providers. The regional distribution systems are responsible for providing the interface with each individual consumer device to the network aggregation system 419. Typically, the regional distribution systems will be geographically dispersed.

Typically, a larger number of networks or systems must be aggregated at a central set of network facilities that have larger capacity. The network aggregation system 419 includes the components necessary to combine any number of regional distribution systems into a smaller composed set, or provide the inverse operation of fanning out a small set of larger networks into many. Two way communication of signals occurs from the regional distribution systems to the network aggregation system 419.

The consumer devices have a primary function to support services provided by content providers or other communication services. The entertainment processing subsystem 422 is connected to the network aggregation system 419 and abstracts all the necessary facilities required for the delivery of such services. For example, the entertainment processing subsystem 422 may include the necessary facilities for delivery of cable or satellite television services. Such facilities are well know and not described further here.

The central device control system 418 is connected to the network aggregation system 419. The central device control system 418 is responsible for managing the operational delivery of device parameters, signaling, security, and control state to the consumer electronic devices for their proper operation on the service provider platform.

The central device network system 420 is connected to the network aggregation system 419. The central device network system 420 may include the network layer, physical layer, and control processing of network elements and their subsystems. This might include facilities to support internet protocol delivery over radio frequency broadband, fiber optically, satellite, and wireless networking as well as digital broadcast streams over MPEG.

The device resource management 424 is connected to the central device network system 420, to the central device control system 418 and to the service application process management system 430. The device resource management 424 is responsible for intelligently managing the consumer device resource pools as a function of dynamic device parametrics, such as CPU load, memory utilization and device availability. The device resource management 424 interacts with the service application process management system 430, providing real time data to optimize the execution of the underlying network of consumer devices.

The process partitioning system 426 is connected to the central device network system 420, to the central device control system 418 and to the service application process management system 430. Application processes are partitioned and then mapped onto device resources. Partitioning is the task of taking a single virtualized service process, and breaking it up, where possible, into multiple processes which can be executed in parallel on different consumer devices. The process partitioning system 426 also performs mapping in conjunction with real time data from the device resource management system 424 to optimally dispatch the individual processes on the best set of consumer devices as determined by service criteria metrics. Mapping criteria may be based in terms of meeting performance or fault tolerance targets. In the case of meeting a performance target, process partitioning and mapping will be optimized for execution concurrency and time. Likewise, a fault tolerance target will require optimization for execution redundancy.

The device scheduling management system 428 is responsible for managing the flow of processes in and out of the consumer devices. It controls when processes are executed and terminated. To facilitate this, the system will interact with the other systems described to insure processes are scheduled appropriately.

A service that will be executed is transposed into one or more application processes which must be controlled, synchronized, managed, and executed. Thus, the service process management system 430 deals with the lifecycle management of all processes associated with the set of services currently being executed and control of the other subsystems involved with any work flow necessary for completion.

The service virtualization layer system 432 is responsible for semantically expressing all computational and application services that outside entities can interact with. Typically a client outside the virtualization layer will negotiate for access to a processing service for some fee. The service is then invoked and any responses are aggregated and provided back to the requesting client. The goal of the virtualization layer is to provide a single transparent view of the underlying consumer device application computation processing fabric hiding service implementation details. It also provides the interaction framework with outside entities for the purposes of providing and transacting services.

The business services interface system 434 provides a well defined physical interaction layer for the transacting of services between the service provider and outside entities wishing to acquire services. It defines the protocols and mechanism for access and delivery of services.

Thus, the present invention provides for distributed processing on one or more service provider networks. The service provider networks may be of the same type or different types. For example, one service provider network could be for delivery of cable television, while another service provider network could be for delivery of cellular phone service.

The tasks or subtasks may be sent to the consumer devices over the service provider networks in known formats such that they can be recognized by the processors on the consumer devices. For example, the processing tasks or subtasks could be sent in a series of packets, with appropriate header information and needed instructions to cause processing at the processor of the consumer device, and to direct the consumer device to return the results. Additionally, the consumer devices can have appropriate software loaded into their memory to cause proper receipt, processing and return of the tasks or subtasks. This software could be preloaded or downloaded to the consumer devices.

Figure 5:
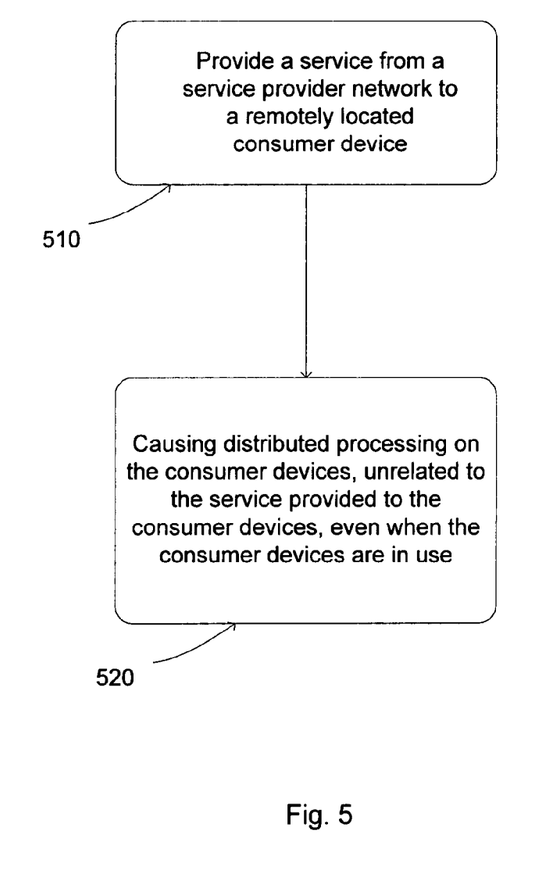
FIG. 5 illustrates a flowchart in accordance with embodiments of the present invention.

FIG. 5 illustrates a flowchart in accordance with embodiments of the present invention. In step 510, a service is provided from a service provider network to the remotely located consumer devices capable of receiving the service. Each of the remotely located consumer devices includes a processing device. In step 520, distributed processing of a task on the processing devices of the remotely located consumer devices occurs. The distributed processing is unrelated to the service provided to the consumers. The distributed processing occurs even when the processing devices are in use by the corresponding remotely located consumer devices.

Figure 6:
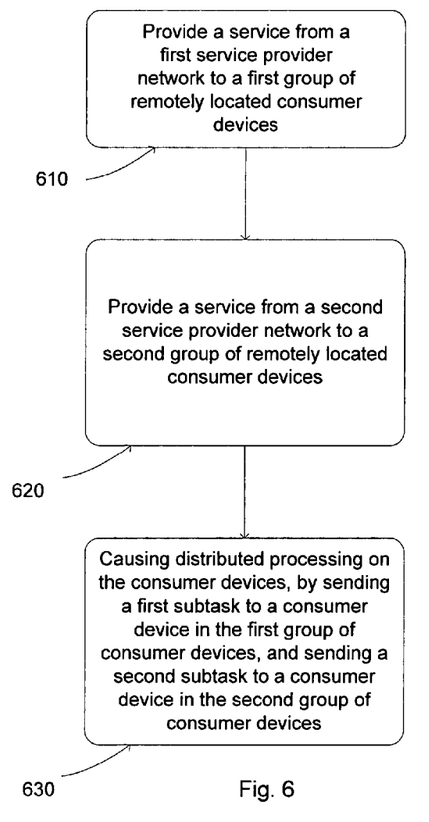
FIG. 6 illustrates a flowchart in accordance with embodiments of the present invention.

FIG. 6 illustrates a flowchart in accordance with embodiments of the present invention. In step 610, a service is provided from a first service provider network to a first group of remotely located consumer devices. In step 620, a service is provided from a second service provider network to a second group of remotely located consumer devices. A task which is to be processed by distributed processing is broken into subtasks. In step 630, distributed processing is caused on the consumer devices, by sending a first subtask to a consumer device in the first group of consumer devices, and sending a second subtask to a consumer device in the second group of consumer devices. The consumer devices execute the subtasks and send the results back to the service provider networks, where the results can be aggregated as described above to complete processing of a tasks. Alternatively, the first subtask can be sent to a first group of the consumer devices, and the second subtask is sent to a second group of the consumer devices. In this way, the subtasks can be processed on more than one processor at the same time, which can provide increased quality of service and fault tolerance.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A system for providing consumer device users with a consumer service from a consumer service provider and for facilitating distributed processing of a task, the task of the distributed processing being unrelated to the consumer service, the system comprising:
    at least one network distribution system that is structured and arranged to provide communication between the consumer service provider and a plurality of consumer devices, each consumer device of the plurality of consumer devices having a processor that is adapted to receive the consumer service from the consumer service provider and to perform distributed processing even when the processor is receiving and processing the consumer service; and
    a device management system that is adapted to:
        receive a processing task;
        subdivide the processing task into a plurality of subtasks;
        assign each subtask of the plurality of subtasks to at least one consumer device of the plurality of consumer devices, wherein at least one consumer device of the plurality of consumer devices includes assigning a first subtask to a first group of consumer devices and assigning a second subtask to a second group of consumer devices;
        receive completed subtasks from each consumer device; and
        aggregate the completed subtasks to complete the processing task.

2. A consumer device for use in the system of claim 1, that is integrated into a service provider network that comprises a plurality of consumer devices for providing consumer device users with a consumer service and for facilitating distributed processing of at least one of a task and a subtask, the at least one of a task and a subtask of the distributed processing being unrelated to the consumer service, the consumer device comprising a processor that is adapted to receive the consumer service from the service provider and to perform distributed processing.

3. The consumer device of claim 2, wherein the consumer device is selected from the group consisting of a cellular phone, a computer, a portable computing device, a set top box, a cable television set top box, a satellite television set top box, a camera, and a combination thereof.

4. The system of claim 1, wherein the device management system is adapted to assign each subtask to a plurality of consumer devices, to provide increased quality of service and fault tolerance.

5. The system of claim 1 further comprising a service management system that is adapted to provide the consumer service.

6. The system of claim 1, wherein the device management system includes a network aggregation system that is adapted to aggregate a plurality of network distribution systems.

7. The system of claim 6, wherein the network aggregation system is in communication with a plurality of regional distribution systems, each regional distribution system of the plurality of regional distribution systems being connected to a plurality of consumer devices, to provide an interface between the plurality of consumer devices and the network aggregation system.

8. The system of claim 6, wherein each regional distribution system is in communication with at least one consumer service provider.

9. A method for providing consumer device users with a consumer service from a consumer service provider and for facilitating distributed processing of a task, the task of the distributed processing being unrelated to the consumer service, the method comprising:
    providing communication between the consumer service provider and a plurality of consumer devices, each consumer device of the plurality of consumer devices having a processor that is adapted to receive the consumer service from the consumer service provider and to perform distributed processing even when the processor is receiving and processing the consumer service, using at least one network distribution system; and
    adapting a device management system to:
        receive a processing task;
        subdivide the processing task into a plurality of subtasks;
        assign each subtask of the plurality of subtasks to at least one consumer device of the plurality of consumer devices, wherein assigning each subtask of the plurality of subtasks to at least one consumer device of the plurality of consumer devices includes assigning a first subtask to a first group of consumer devices and assigning a second subtask to a second group of consumer devices;
        receive completed subtasks from each consumer device; and
        aggregate the completed subtasks to complete the processing task.

10. The method of claim 9, further comprising adapting the device management system to assign each subtask to a plurality of consumer devices, to provide increased quality of service and fault tolerance.

11. The method of claim 9, wherein adapting the device management system includes adapting a network aggregation system to aggregate a plurality of network distribution systems.

12. The method of claim 9, wherein the method includes concurrently providing consumer device users with a consumer service from a consumer service provider and for facilitating distributed processing of a task.

13. The method of claim 11, wherein the network aggregation system is in communication with a plurality of regional distribution systems, and the method includes connecting each regional distribution system of the plurality of regional distribution systems to a plurality of consumer devices, to provide an interface between the plurality of consumer devices and the network aggregation system.

14. The method of claim 11, wherein each regional distribution system is in communication with at least one consumer service provider.

15. The method of claim 11, wherein assigning each subtask of the plurality of subtasks to at least one consumer device of the plurality of consumer devices includes assigning a first subtask to a first group of consumer devices and assigning a second subtask to a second group of consumer devices.

* * * * *